United States Patent
Kulkarni et al.

(10) Patent No.: US 8,728,574 B2
(45) Date of Patent: *May 20, 2014

(54) METHODS FOR INTRODUCING A FIRST GAS AND A SECOND GAS INTO A REACTION CHAMBER

(75) Inventors: Milind S. Kulkarni, St. Louis, MO (US); Puneet Gupta, Houston, TX (US); Balaji Devulapalli, Chesterfield, MO (US); Jameel Ibrahim, Humble, TX (US); Vithal Revankar, Seabrook, TX (US); Kwasi Foli, Columbia, MD (US)

(73) Assignee: MEMC Electronic Materials, Inc., St. Peters, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/455,483

(22) Filed: Apr. 25, 2012

(65) Prior Publication Data

US 2012/0230903 A1     Sep. 13, 2012

Related U.S. Application Data

(62) Division of application No. 13/163,027, filed on Jun. 17, 2011, now Pat. No. 8,404,206, which is a division of application No. 12/494,006, filed on Jun. 29, 2009.

(60) Provisional application No. 61/076,886, filed on Jun. 30, 2008.

(51) Int. Cl.
  *B01J 8/00* (2006.01)
  *C01B 33/027* (2006.01)
  *B01J 8/18* (2006.01)
  *B01J 8/44* (2006.01)

(52) U.S. Cl.
  USPC ........... 427/213; 423/349; 422/143; 422/220; 422/311

(58) Field of Classification Search
  USPC ................. 423/348–350; 422/139, 143, 311; 427/185, 213
  See application file for complete search history.

(56) References Cited

U.S. PATENT DOCUMENTS

| | | |
|---|---|---|
| 2,468,508 A | 4/1949 | Munday |
| 2,487,984 A | 11/1949 | Rodman |
| 2,740,752 A | 1/1962 | Anhorn |

(Continued)

FOREIGN PATENT DOCUMENTS

| | | |
|---|---|---|
| CA | 1332782 CA | 11/1994 |
| DE | 3910343 A1 | 10/1989 |

(Continued)

OTHER PUBLICATIONS

Perry, "Design of Fluidized-Bed Systems," 1997, Seventh Edition, pp. 17-4 to 17-19.*

(Continued)

*Primary Examiner* — Steven Bos
*Assistant Examiner* — Justin Bova
(74) *Attorney, Agent, or Firm* — Armstrong Teasdale LLP

(57) ABSTRACT

Gas distribution units of fluidized bed reactors are configured to direct thermally decomposable compounds to the center portion of the reactor and away from the reactor wall to prevent deposition of material on the reactor wall and process for producing polycrystalline silicon product in a reactor that reduce the amount of silicon which deposits on the reactor wall.

13 Claims, 8 Drawing Sheets

(56) References Cited

U.S. PATENT DOCUMENTS

| | | | |
|---|---|---|---|
| 3,636,923 A | 1/1972 | McCreary et al. | |
| 3,933,985 A | 1/1976 | Rodgers | |
| 4,092,446 A | 5/1978 | Padovani et al. | |
| 4,170,667 A | 10/1979 | Rodgers | |
| 4,213,937 A | 7/1980 | Padovani et al. | |
| 4,318,942 A | 3/1982 | Woerner et al. | |
| 4,491,604 A | 1/1985 | Lesk et al. | |
| 4,529,576 A | 7/1985 | Sancier | |
| 4,818,495 A * | 4/1989 | Iya | 422/145 |
| 4,868,013 A | 9/1989 | Allen | |
| 5,374,413 A * | 12/1994 | Kim et al. | 423/349 |
| 5,798,137 A | 8/1998 | Lord et al. | |
| 6,007,869 A * | 12/1999 | Schreieder et al. | 427/213 |
| 6,352,680 B1 | 3/2002 | Watson et al. | |
| 6,368,568 B1 | 4/2002 | Lord | |
| 6,451,277 B1 | 9/2002 | Lord | |
| 6,486,217 B2 * | 11/2002 | Chang et al. | 518/700 |
| 6,541,377 B2 | 4/2003 | Kim et al. | |
| 6,709,636 B1 | 3/2004 | Oshita et al. | |
| 6,719,952 B1 | 4/2004 | Yang et al. | |
| 6,827,786 B2 | 12/2004 | Lord | |
| 7,029,632 B1 * | 4/2006 | Weidhaus et al. | 422/139 |
| 2002/0081250 A1 | 6/2002 | Lord | |
| 2003/0147798 A1 | 8/2003 | Kirii et al. | |
| 2004/0052692 A1 * | 3/2004 | Hottovy et al. | 422/143 |
| 2004/0052716 A1 | 3/2004 | Wakamatsu et al. | |
| 2008/0056979 A1 | 3/2008 | Arvidson et al. | |
| 2008/0241046 A1 * | 10/2008 | Hertlein et al. | 423/349 |
| 2009/0004090 A1 | 1/2009 | Kim et al. | |
| 2009/0095710 A1 | 4/2009 | Kim et al. | |
| 2009/0324479 A1 | 12/2009 | Kulkarni et al. | |
| 2011/0158857 A1 | 6/2011 | Erk | |
| 2011/0158888 A1 | 6/2011 | Erk | |
| 2011/0244124 A1 | 10/2011 | Kulkarni et al. | |

FOREIGN PATENT DOCUMENTS

| | | | |
|---|---|---|---|
| DE | 102005042753 A1 | 3/2007 | |
| EP | 0974552 A2 | 1/2000 | |
| FR | 2805178 A1 | 8/2001 | |
| JP | 59045917 A | 3/1984 | |
| JP | 59107917 A1 | 6/1984 | |
| JP | 62079843 A | 4/1987 | |
| JP | 02-021938 A | 1/1990 | |
| JP | 2279512 A | 11/1990 | |
| JP | 04297515 A | 10/1992 | |
| JP | 06-191818 A | 7/1994 | |
| WO | 2004013044 A1 | 2/2004 | |
| WO | 2007012027 A2 | 1/2007 | |
| WO | WO 2007028776 A2 * | 3/2007 | |
| WO | 2007094607 A1 | 8/2007 | |
| WO | 2007145474 A1 | 12/2007 | |
| WO | 2008027101 A1 | 3/2008 | |

OTHER PUBLICATIONS

Goldberg et al., "Reactions of SiCl2 with N2O, NO and O2," Phys. Chem. Chem. Phys., 5: 5371-5377 (2003).
Hashim et al., "High Purity Polycrystalline Silicon Growth and Characterization," Chiang Mai J. Sci., 34(1): 47-53 (2007).
EPC Communication for analogous Application No. 09774266.2, dated Aug. 9, 2011 (5 pages).
International Search Report for analogous Application No. PCT/US2009/049113, dated Dec. 30, 2009 (3 pages).
Non-Final Office action issued for co-owned U.S. Appl. No. 12/494,006, dated Mar. 3, 2011 (10 pages).
Final Office action issued for co-owned U.S. Appl. No. 12/494,006, dated Aug. 10, 2011 (12 pages).
Non-Final Office action issued for co-owned U.S. Appl. No. 12/494,006, dated May 16, 2012 (14 pages).
Non-Final Office action issued for co-owned U.S. Appl. No. 13/163,027, dated May 22, 2012 (9 pages).
Non-Final Office action issued for co-owned U.S. Appl. No. 12/977,849, dated Oct. 17, 2011 (9 pages).
Final Office action issued for co-owned U.S. Appl. No. 12/977,849, dated May 14, 2012 (13 pages).
International Search Report and Written Opinion issued in PCT/US2010/062088 mailed May 17, 2011.
Office Action issued in European Patent Application No. 10 805 357.0 on May 7, 2013, 4 pages.
Japanese Office Action issued in Japanese Application No. 2011-516787, mailed on Dec. 3, 2013.

* cited by examiner

METHODS FOR INTRODUCING A FIRST GAS AND A SECOND GAS INTO A REACTION CHAMBER

CROSS-REFERENCE TO RELATED APPLICATIONS

This application is a Divisional of U.S. patent application Ser. No. 13/163,027, filed Jun. 17, 2011 which is a Divisional of U.S. patent application Ser. No. 12/494,006, filed Jun. 29, 2009, which claims the benefit of U.S. Provisional Application No. 61/076,886, filed Jun. 30, 2008, each of which are incorporated herein by reference.

BACKGROUND OF THE INVENTION

This invention relates to fluidized bed reactor systems and to the production of polycrystalline silicon from a thermally decomposable silicon compound such as, for example, silane.

Fluidized bed reactors are used to carry out multiphase reactions. In typical fluidized bed reactor systems a fluid is passed through a bed of granular material such as a catalyst or growing product particles. The flow of fluid causes the bed of granular material to become fluidized in the reactor.

In many fluidized bed reactor systems and especially in systems where material from the fluid phase chemically decomposes to form solid material, solids may deposit onto the walls of the reactor. The wall deposits often alter the reactor geometry which can decrease reactor performance. Further, portions of the wall deposits can dislodge from the reactor wall and fall to the reactor bottom. Often the reactor system must be shut down to remove the dislodged deposits. To prevent an untimely reactor shut down, the deposits must be periodically etched from the reactor wall and the reactor must be cleaned thereby reducing the productivity of the reactor. These problems are particularly acute in fluidized bed reactor systems used in the production of polycrystalline silicon.

Thus a need exists for reactor systems and methods for producing polycrystalline silicon which limit or reduce the amount of deposits that form on the reactor walls.

SUMMARY OF THE INVENTION

One aspect of the present invention is directed to a process for producing polycrystalline silicon product in a reactor having a reaction chamber and a distributor for evenly distributing gas into the reaction chamber. The reaction chamber has at least one reaction chamber wall. The distributor has a plurality of distribution openings which provide fluid communication between a source of gas and the reaction chamber, the plurality of distribution openings having at least one peripheral opening and at least one central opening. According to the process of the present invention, a carrier gas and a thermally decomposable silicon compound are fed through the distribution openings of the distributor and into the reaction chamber, wherein the concentration of carrier gas in the gas fed through the peripheral openings exceeds the concentration of carrier gas in the gas fed through the central openings to reduce the amount of silicon which deposits on the reactor wall. The thermally decomposable silicon compound is contacted with silicon particles in the reaction chamber to cause silicon to deposit onto the silicon particles causing them to increase in size.

Another aspect of the present invention is directed to a distributor for distributing a first gas and a second gas into a reaction chamber having at least one reaction chamber wall, the distributor having a plurality of distribution openings including at least one peripheral opening and at least one central opening, wherein the peripheral openings are configured to provide fluid communication with the source of first gas and not the source of second gas.

Another aspect of the present invention is directed to a fluidized bed reactor system having a reaction chamber with at least one reaction chamber wall and a distributor for distributing gas into the reaction chamber and comprising a plurality of distribution openings which provide fluid communication between both a source of a first gas and a source of a second gas and the reaction chamber, the plurality of distribution openings comprising at least one peripheral opening and at least one central opening, wherein the peripheral openings are in fluid communication with the source of first gas and are not in fluid communication with the source of second gas.

Various refinements exist of the features noted in relation to the above-mentioned aspects of the present invention. Further features may also be incorporated in the above-mentioned aspects of the present invention as well. These refinements and additional features may exist individually or in any combination. For instance, various features discussed below in relation to any of the illustrated embodiments of the present invention may be incorporated into any of the above-described aspects of the present invention, alone or in any combination.

BRIEF DESCRIPTION OF THE DRAWINGS

Corresponding reference characters indicate corresponding parts throughout the drawings.

DETAILED DESCRIPTION

The fluidized bed reactor systems and gas distribution units described herein are suitable for distributing a first gas and a second gas to a fluidized bed reactor and depositing a compound from one of the gases on the surface of fluidized particles. The reactor systems and distribution units are especially well suited for reducing the rate of deposition of thermally decomposable compounds (e.g., deposition of silicon from silane) on the walls of the reactor. The distributors of the reaction systems are configured to direct the thermally decomposable compounds to the center portion of the reactor and away from the reactor wall to prevent deposition of material (e.g., such as silicon) on the reactor wall. The systems may be used to produce polycrystalline silicon from a thermally decomposable silicon compound as described below under the heading "Process for Producing Polycrystalline Silicon."

I. Fluidized Bed Reactor System

Figure 1:
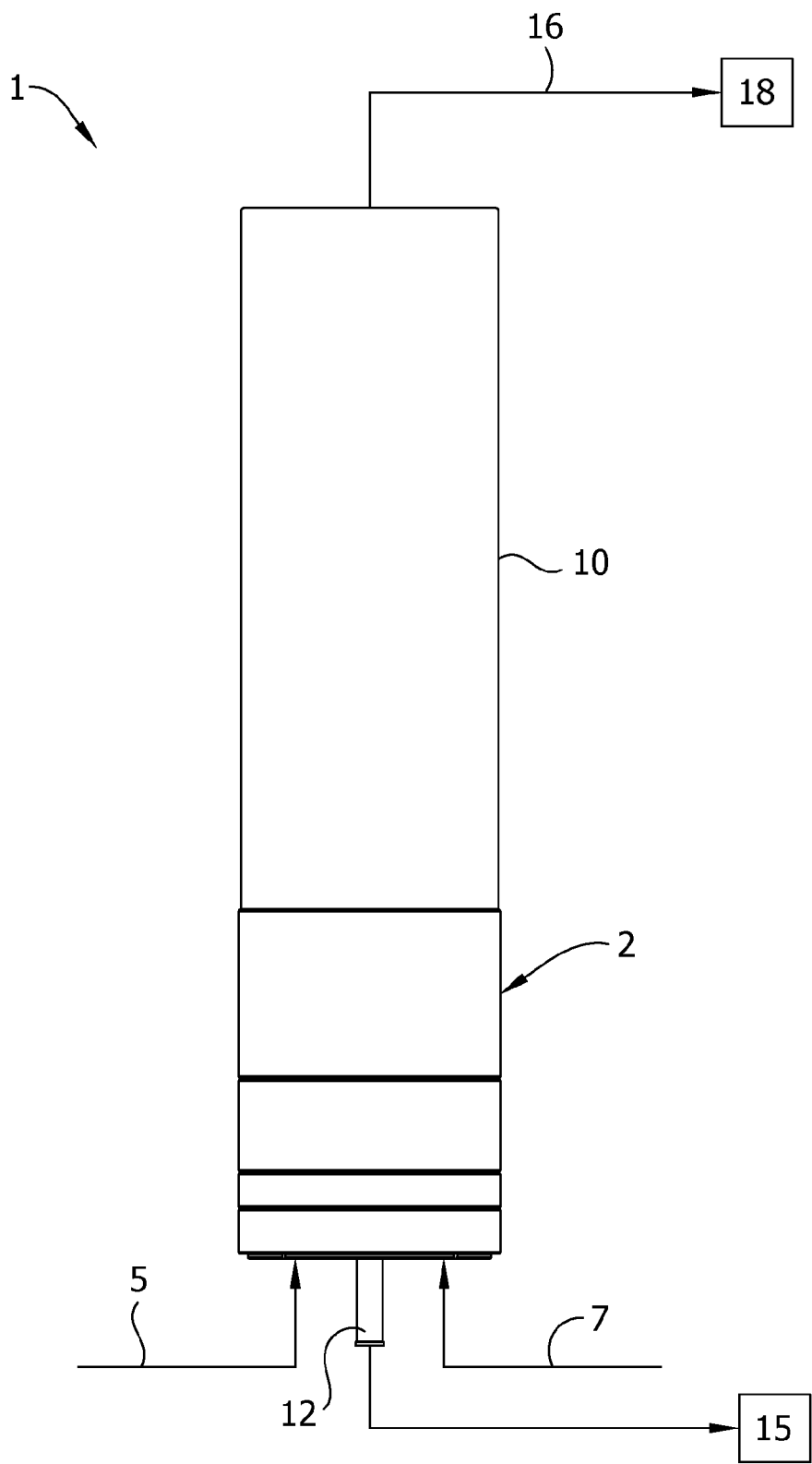
FIG. 1 is a schematic of the flows entering and exiting a fluidized bed reactor system.

Referring now to FIG. 1, a fluidized bed reactor constructed in accordance with embodiments of the present invention is generally designated as 1. The reactor system 1 includes a reaction chamber 10 and a gas distribution unit 2. A source of a first gas 5 and a source of second gas 7 are introduced into the distribution unit 2 to evenly distribute the respective gases into the inlet of the reaction chamber 10. The distribution unit 2 helps evenly distribute reactive gases throughout the reaction chamber 10 to maximize the rate of deposition of material onto the fluidized particles in the chamber.

As used herein, "first gas" is a gas with a different composition than the "second gas" and vice versa. The first gas and second gas can compose a plurality of gaseous compounds as long as the mass composition or molar composition of at least one of the compounds in the first gas is different than the composition of that compound in the second gas. A product withdrawal tube 12 extends through the gas distribution unit 2. Product particles can be withdrawn from the tube 12 and transported to product storage 15. Spent gas 16 exits the reactor chamber 16 and can be introduced into further processing units 18.

Figure 2:
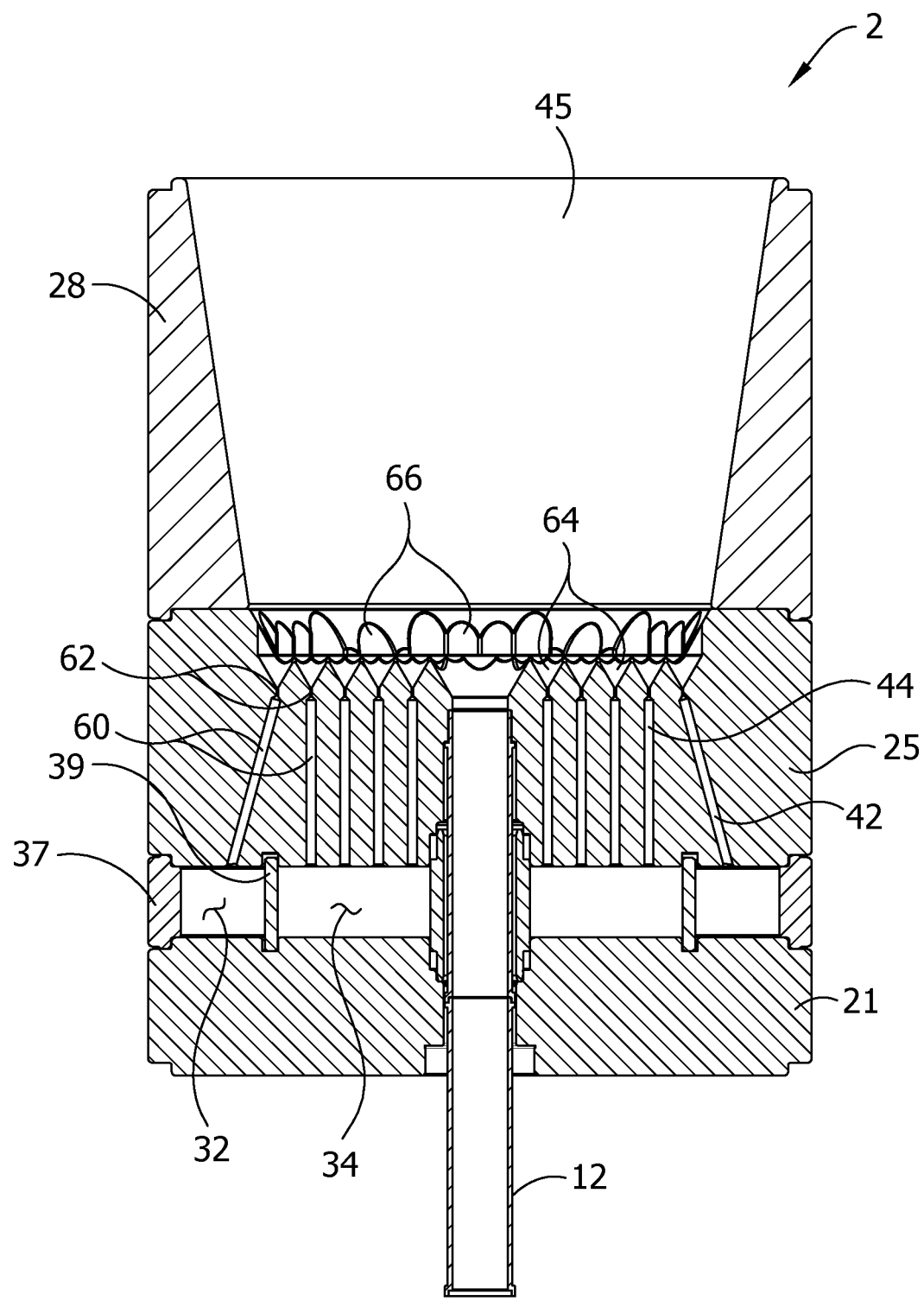
FIG. 2 is a longitudinal section of one embodiment of a gas distribution unit shown in FIG. 1 taken along the line 2-2 of FIG. 4.

The gas distribution unit 2 is shown in greater detail in FIG. 2. The gas distribution unit 2 is suitable for distributing a first gas and a second gas to a fluidized bed reactor and is especially well suited for distributing a carrier gas and a thermally decomposable gas to a fluidized bed reactor.

The gas distribution unit 2 includes an inlet block 21, distributor 25 and taper liner 28. An outer annular ring 37 and a concentric inner annular ring 39 are located between the inlet block 21 and distributor 25. A first gas plenum 32 is defined between the outer annular ring 37 and the inner annular ring 39. The product recovery tube 12 is concentric to the outer annular ring 37 and inner annular ring 39. The tube 12 extends below the inlet block 21. A second gas plenum 34 is defined between the inner annular ring 39 and the tube 12.

The taper liner 28 defines a liner chamber 45. The liner chamber 45 opens into the cylindrical section of the reaction chamber (not shown) and tapers outward in diameter from the distributor 25 to the cylindrical section of reaction chamber. Because particles and incoming gases come into contact in the liner chamber 45 and because a majority of the system reactions may take place in the liner chamber, the liner chamber is considered part of the reaction chamber. For purposes of the application, "reaction chamber" as used herein includes the liner chamber 45.

A series of peripheral distribution openings 42 and central distribution openings 44 are located within the distributor 25. As used herein, "peripheral distribution openings" or "peripheral openings" refer to distributor openings that are generally near the outer wall(s) of the reaction chamber in relation to the central openings and "central distribution openings" or "central openings" refer to distributor openings that are generally interior to the peripheral openings. The peripheral openings 42 are in fluid communication with the first gas plenum 32 and the reaction chamber 10. The central openings 44 are in fluid communication with the second gas plenum 34 and the reaction chamber 10. Generally, the peripheral openings are not in fluid communication with the second gas and the central openings are not in fluid communication with the first gas.

When the first gas does not contribute (or contributes to a lesser extent than the second gas) to deposition of material on the particles (e.g., when the first gas is hydrogen or an inert gas such as a noble gas), configuring the peripheral openings to be in fluid communication with the first gas causes a larger concentration of the first gas to be present at the walls of the reaction chamber as compared to the interior space. This causes less material to deposit from the second gas onto the rector walls as compared to a configuration where the first and second gases are evenly distributed through the distributor 25.

In some embodiments, a portion of the peripheral openings are in fluid communication with the second gas and a portion of the central openings are in fluid communication with the first gas. In these embodiments, generally the percentage of the peripheral openings in fluid communication with the first gas is greater than the percentage of central openings in fluid communication with the first gas. This configuration also causes a larger concentration of first gas (e.g., a carrier gas such as hydrogen or an inert) to be present at the walls of the reaction chamber as compared to the interior space of the reaction chamber.

The central openings 44 and peripheral openings 42 include a channel portion 60, a throttle portion 62 and flare out portion 64. The flare out portion 64 opens into a cone 66. The throttle portion 62 helps to provide resistance to flow and allows the gas to be evenly distributed through each opening 42, 44 and into the inlet of the reaction chamber 10. The cones 66 help distribute the gas from the openings 42, 44 into the reaction chamber 10. The cones 66 are generally hexagonal in shape (FIG. 5).

Figure 3:
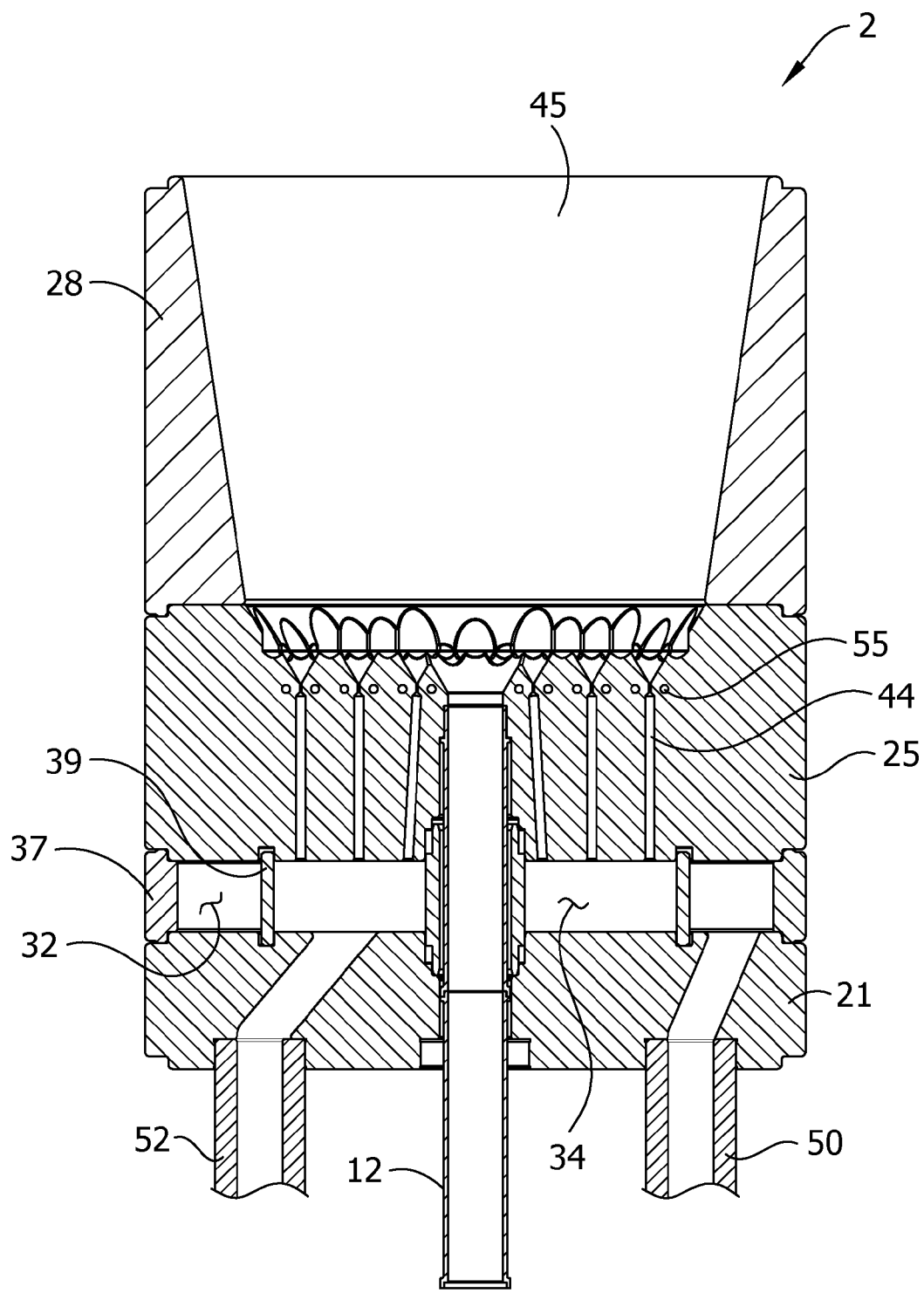
FIG. 3 is a second longitudinal section the gas distribution unit shown in FIG. 1 taken along the line 3-3 of FIG. 4.

Another longitudinal section of the gas distribution unit 2 is illustrated in FIG. 3 with several other features of the unit shown. A first gas inlet tube 50 extends through the inlet block 21 and is in fluid communication with the first gas plenum 32 and a source of first gas (not shown). A second gas inlet tube 52 extends through the inlet block 21 and is in fluid communication with the second gas plenum 34 and a source of second gas (not shown).

Cooling channels 55 are located in the distributor 25. Fluid (e.g., air or cooling liquid) is circulated through the cooling channels 55 to cool the distributor below the temperature at which material thermally decomposes from the first or second gases. The cooling channels 55 prevent material from depositing on the distributor openings 42, 44.

Figure 4:
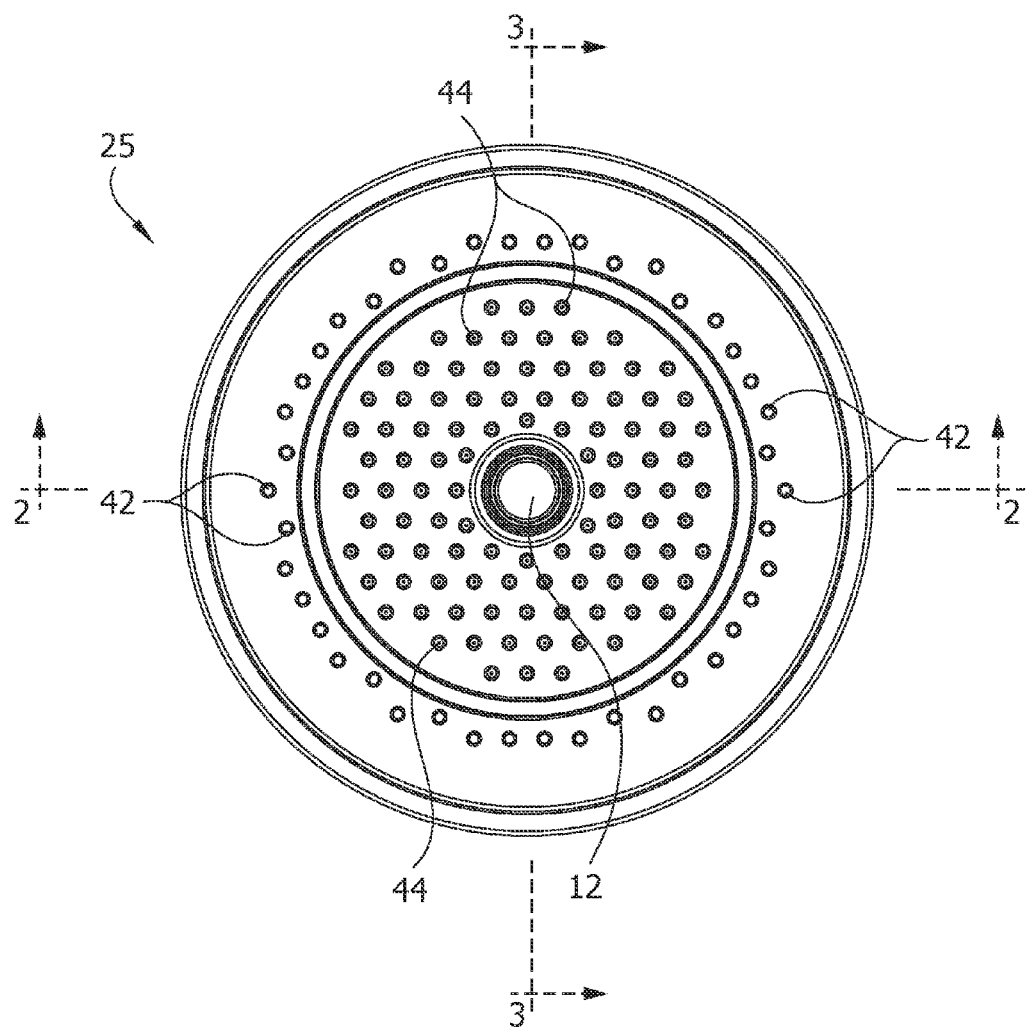
FIG. 4 is a bottom view of the distributor of the gas distribution unit.
Figure 5:
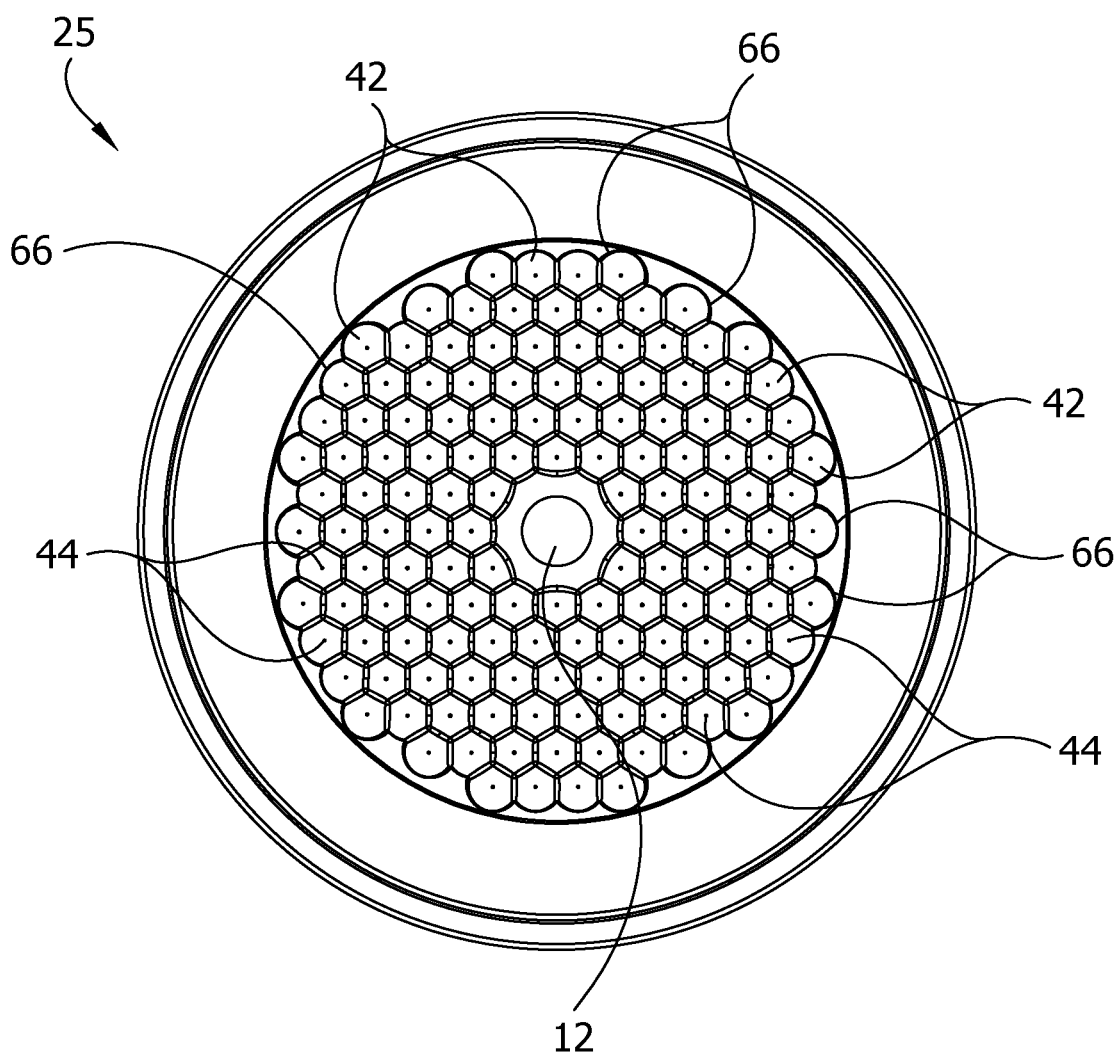
FIG. 5 is a top view of the distributor of the gas distribution unit.

The bottom view of the distributor 25 is illustrated in FIG. 4 and the top view of the distributor 25 is illustrated in FIG. 5. As can be seen from FIG. 4, the peripheral openings 42 are spaced from the central openings 44 at the bottom of the distributor. The peripheral openings 42 angle toward the central openings 44 from the bottom to the top of the distributor 25. As can be seen from FIG. 5, the peripheral openings 42 are adjacent to the central openings 44 at the top of the distributor 25.

II. Process for Producing Polycrystalline Silicon

Polycrystalline silicon is a vital raw material used to produce many commercial products including, for example, integrated circuits and photovoltaic (i.e., solar) cells. Polycrystalline silicon is typically produced by a chemical vapor deposition mechanism in which silicon is deposited from a thermally decomposable silicon compound onto silicon particles in a fluidized bed reactor. The seed particles continuously grow in size until it exits the reactor as polycrystalline silicon product (i.e., "granular" polycrystalline silicon). Suitable decomposable silicon compounds include, for example, silane and halosilanes (e.g., trichlorosilane).

For example, polycrystalline silicon particles having a particle size of about 50 µm to 800 µm are added to the reaction chamber to initiate deposition of silicon. The particle size of the seed particles may be from about 50 µm to about 800 µm and is more typically from about 250 µm to about 600 µm. Two types of silicon seed particles are commonly used. Silicon seed particles provided by grinding or breaking product particles collected from the reactor to a typical particle size from about 250 µm to about 350 µm may be used. Alternatively or in addition, small polycrystalline particles gathered with and separated from the granular polycrystalline product having a particle size of from about 500 µm to about 600 µm may be used as seed particles.

Figure 7:
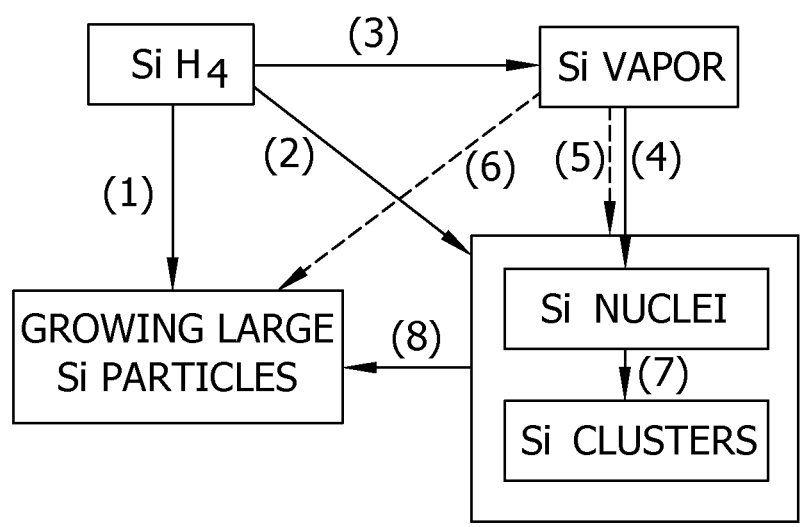
FIG. 7 is a schematic depiction of reaction mechanisms that take place in a granular polycrystalline silicon reactor system.

A variety of reactions may take place in the reaction chamber. The reaction mechanisms which are known to occur in a silane fluidized bed reactor system are generally illustrated in FIG. 7. These mechanisms in no way limit embodiments of the present invention as they do not constitute the entire set of reactions which may take in the reactor system.

With reference to FIG. 7, in a silane system, silicon heterogeneously deposits onto the growing silicon particle (1). Silane may also decompose to produce silicon vapor (3) which can homogenously nucleate to form undesirable silicon dust (synonymously silicon "fines" or "powder") (4) and which can deposit on the growing silicon particle (6). The silicon fines can grow in size by deposition of silicon from silane (2) or from any silicon vapor (5). The fines can combine to form larger fines (7). Silicon fines can agglomerate with growing silicon particles (8). The agglomeration is caused by bombardment of the fines and particles. It is believed that once the fines contact the particles they agglomerate due to molecular forces.

Typically, the size of the silicon dust particulate is less than about 50 µm and, in some embodiments, is less than about 5 µm. Granular polycrystalline product typically has a particle size of about 600 µm to about 2000 µm and more typically from about 800 µm to about 1200 µm or even from about 900 µm to about 1000 µm.

As silicon deposits from the silane onto the growing silicon particle additional hydrogen is released from the silane molecule. The silicon dust is carried out of the reactor with the hydrogen gas and unreacted silane (collectively "spent gas") that exit the reactor. The silicon dust is separated from the spent gas that exits the reactor by, for example, bag-filtration, cyclone separation or liquid scrubbers.

Recovered silicon dust may be used industrially but it has less value than granular polycrystalline silicon. For instance, silicon dust may be used to produce monocrystalline silicon by the Czochralski method, a method that involves drawing single crystal silicon from melted polycrystalline silicon by pulling a seed crystal brought into contact with the molten polycrystalline silicon. When silicon dust is used in the Czochralski method, the silicon dust is difficult to melt cleanly and it is more difficult to pull the crystal from the melt. As a result, silicon dust is sold at a large discount as compared to granular polycrystalline silicon. Alternatively, the silicon dust may be recycled back into the reactor and/or fed into one or more additional fluid bed reactors wherein the silicon dust is at least partially scavenged by silicon particles.

The process of the present invention includes introducing a feed gas including a gaseous silicon compound capable of being thermally decomposed into a reactor. The feed gas is heated in the reaction chamber to cause at least a portion of the silicon in the silicon compound to deposit, by chemical vapor deposition, onto the silicon particles in the reaction chamber, thereby growing the silicon particles into larger particles typically referred to as granular polysilicon. Another portion of the thermally decomposable silicon compound decomposes to form among other things, silicon vapor.

The process of the present invention may carry out the reaction in a single fluidized bed reactor or may incorporate one or more fluidized bed reactors configured in series or in parallel. The fluidized bed reactors may be operated in a continuous manner in which feed and product are continually introduced and withdrawn from the reactor or in a batch process without departing from the scope of the present disclosure.

A schematic diagram illustrating an embodiment of the process of the present invention is depicted in FIG. 1.

III. Feed Gases

The process for producing polycrystalline silicon will now be described with reference to the fluidized bed reactor system 1 illustrated in FIG. 1. A thermally decomposable compound 7 and carrier gas 5 are fed from their respective source to the reactor system 1. The carrier gas 5 may include hydrogen or a noble gas such as argon or helium and mixtures thereof.

Thermally decomposable silicon compounds include compounds generally capable of being thermally decomposed to produce silicon. Additional products may be produced from the decomposition process, without departing from the scope of the present invention, as long as it provides a source of silicon to grow the polysilicon particles to form polysilicon granules. Thermally decomposable silicon compound gases include all gases containing silicon, that can be heterogeneously deposited by chemical vapor deposition, such as silicon tetrahydride (commonly referred to as silane), trichlorosilane and other silicon halides, wherein one or more of the hydrogen atoms of silane is substituted with a halogen such as chlorine, bromine, fluorine and iodine.

The thermally decomposable compound may be introduced into the reactor without dilution or the gas may be diluted with a carrier gas such as hydrogen, argon, helium or combinations thereof. During decomposition, by-product hydrogen is produced that may be recycled for use as a carrier gas for additional quantities of thermally decomposable feed gas in the operation of the reactor system, if needed.

IV. Reaction Chamber

The reaction chamber is typically a fluidized bed in which silicon particles are suspended by an upward flow of the fluidizing gas in the reactor. Fluidized bed reactors provide high mass transfer and heat transfer rates between growing silicon particles and the gas phase which enhances the deposition rate of silicon onto the particles. The fluidized bed reactor is generally a cylindrical vertical vessel, however, any configuration that is acceptable to fluidized bed operations may be utilized. The particular dimensions of the reactor will be primarily dependent upon system design factors that may vary from system to system such as the desired system output, heat transfer efficiencies and system fluid dynamics, without departing from the scope of the present invention.

Typically, extraneous heat is used to cause the temperature of the thermally decomposable gas to increase to the point at which the gas decomposes. Methods for heating include, for example, capacitive heating, induction coils and electrical resistance elements.

Referring now to FIGS. 2-6, the carrier gas is fed through the first gas inlet tube 50 and proceeds to the first gas plenum 32. From the first gas plenum 32 the carrier gas passes through a series of peripheral distribution openings 42 and into the liner chamber 45 and reaction chamber 10.

The thermally decomposable compound is fed through the second gas inlet tube 52 and proceeds to the second gas plenum 34. A gas other than the thermally decomposable compound (e.g., an amount of carrier gas) may be fed with the thermally decomposable compound through the second gas inlet tube 52 without departing from the scope of the present disclosure. From the second gas plenum 32 the thermally decomposable compound passes through a series of central distribution openings 44 and into the liner chamber 45 and reaction chamber 10. Because the carrier gas enters the reaction chamber 10 near the reaction chamber wall (and enter the liner chamber 45 near the taper liner 28), the combined carrier gas and thermally decomposable silicon compound that contacts the reactor wall contains a greater concentration of carrier gas as compared to the gas at the interior portion of the reaction chamber. This arrangement prevents undesirable build-up of silicon on the reactor wall.

According to another embodiment of the present invention, the carrier gas fed 5 through the peripheral distribution openings 42 may contain an amount of the thermally decomposable compounds and/or the thermally decomposable gas 7 fed through the central distribution openings 44 may contain an amount of the carrier gas. In this embodiment the concentration of carrier gas in the gas fed through the peripheral openings exceeds the concentration of carrier gas in the gas fed through the central openings to reduce the amount of silicon which deposits on the reactor wall.

V. Reaction Conditions

During operation of the reaction system, the gas velocity through the reaction zone is maintained above the minimum fluidization velocity of the silicon particles. The gas velocity through the reactor is generally maintained at a velocity of from about one to about eight times the minimum fluidization velocity necessary to fluidize the particles within the fluidized bed. In some embodiments, the gas velocity is from about two to about five times, and in at least one embodiment is about four times the minimum fluidization velocity necessary to fluidize the particles within the fluidized bed. The minimum fluidization velocity varies depending on the properties of the gas and particles involved. The minimum fluidization velocity may be determined by conventional means (see p. 17-4 of Perry's Chemical Engineers' Handbook, 7th. Ed., incorporated herein by reference).

The minimum fluidization conditions are preferably calculated for conditions as they exist near the gas distributor. Using these conditions, which include temperatures that are normally cooler than the rest of the reactor, it is possible to ensure the minimum fluidization in the entire bed. Although the present invention is not limited to specific minimum fluidization velocities, minimum fluidization velocities useful in the present invention range from about 0.7 cm/sec to about 350 cm/sec or even from about 6 cm/sec to about 150 cm/sec.

Gas velocities higher than the minimum fluidization flow rate are often desired to achieve higher productivities. As the gas velocity increases beyond the minimum fluidization velocity the excess gas forms bubbles, increasing the bed voidage. The bed can be viewed to consist of bubbles and "emulsion" containing gas in contact with silicon particles. The quality of the emulsion is quite similar to the quality of the bed at the minimum fluidization condition. The local voidage in the emulsion is close to the minimum fluidization bed voidage. Hence, bubbles are generated by the gas introduced in excess of what is required to achieve the minimum fluidization. As the ratio of actual gas velocity divided by the minimum velocity increases, the bubble formation intensifies. At a very high ratio, large slugs of gas are formed in the bed. As the bed voidage increases with the total gas flow rate, the contact between solids and gases becomes less effective. For a given volume of the bed, the surface area of solids in contact with reacting gases decreases with increasing bed voidage. Thus, for the given bed length, the conversion of thermally decomposable gas decreases. Conversion may also decrease with decreased gas residence time through the reaction chamber. In addition, different undesired reactions can take place at higher rates producing more fines.

The temperature in the reactor is maintained within the decomposition temperature range of the thermally decomposable compound and the melting point temperature of silicon. The temperature of the reactor may be maintained from about 200° C. to about 1400° C., typically from about 600° C. to about 700° C. or even from about 625° C. to about 655° C. The heat that is used to maintain the reaction zone at such temperatures may be provided by conventional heating systems such as electrical resistance heaters disposed on the exterior of the reactor vessel wall. The pressure in the reactor is typically about 1.73 atmosphere at the top of the bed.

EXAMPLE 1

Figure 6:
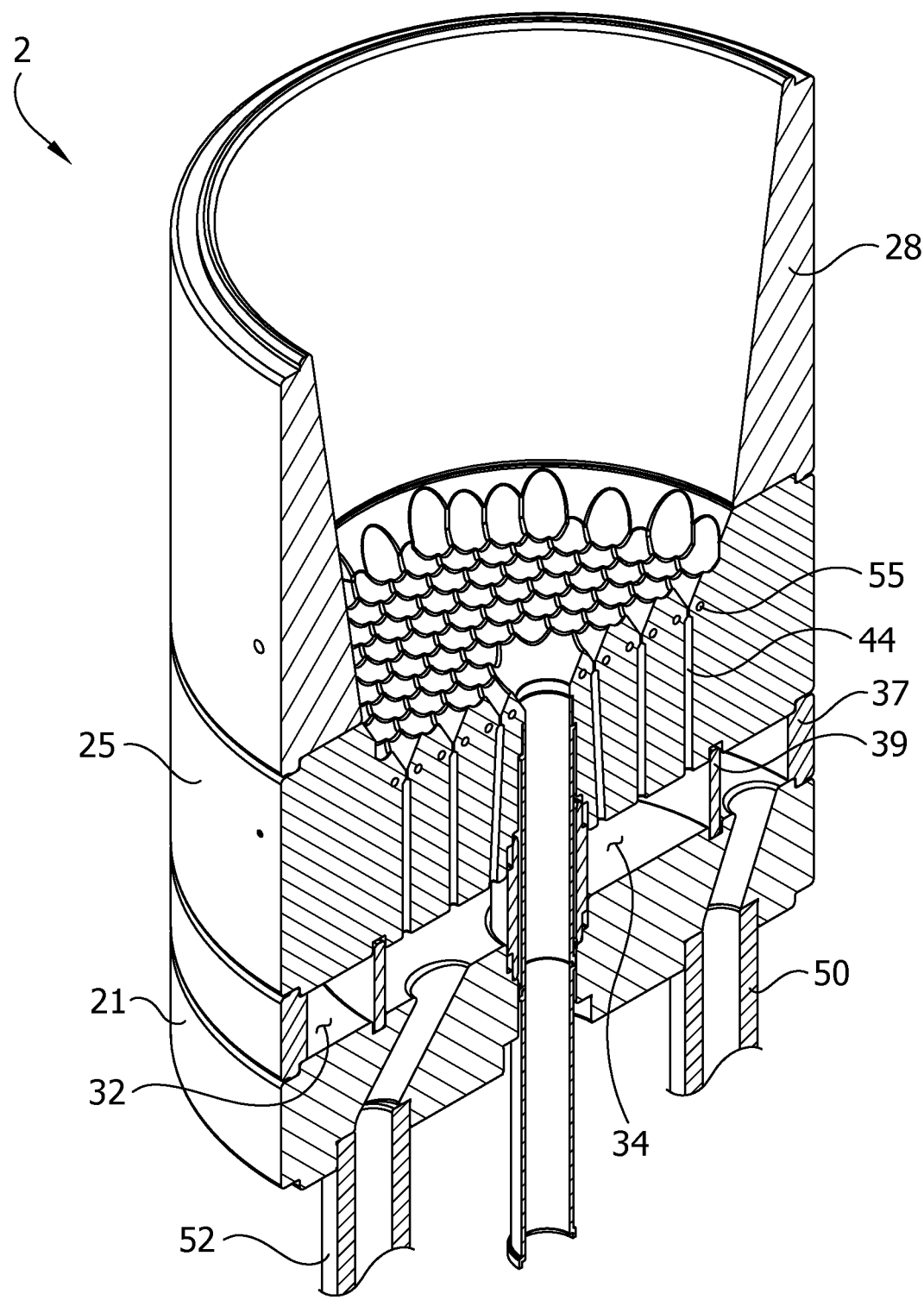
FIG. 6 is a perspective longitudinal section of the gas distribution unit.
Figure 8:
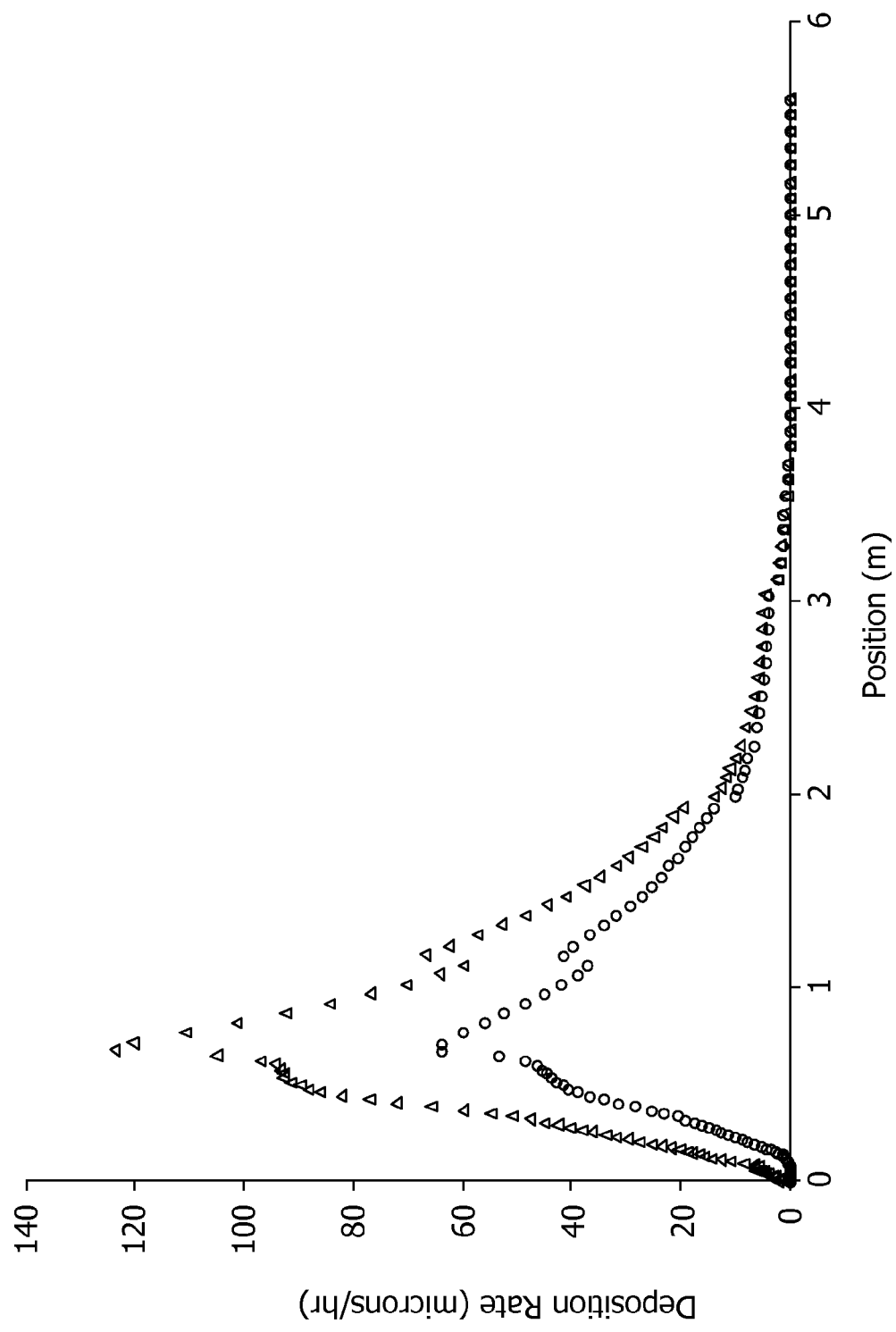
FIG. 8 is a graphical depiction of computer simulations of the rate of deposition on the reactor wall according to conventional deposition methods and according to methods of present invention including the fluidized bed reactor and distribution units of FIGS. 1-6.

Computer Simulated Comparison of Conventional Deposition and Deposition According to Embodiments of the Present Invention The deposition rates of silicon on the wall of a reaction chamber (including deposition on the inner surface of the taper liner of the liner chamber) over the length of the reactor under two computer simulations are shown in FIG. 8. Position "0" represents the bottom of the taper liner 28 (FIG. 6). The data points illustrated by triangles (i.e., the data line with the higher peak) depict the deposition rates over the length of a fluidized bed reactor operated by conventional methods and the data points illustrated by circles (i.e., the data line with the lower peak) depict the deposition rates over the length of a fluidized bed reactor shown in FIGS. 1-6 and described above. Both simulations used hydrogen as a carrier gas and silane was used as the thermally decomposable compound. In the reactor operated by conventional deposition methods, hydrogen and silane were introduced into the distributor uniformly across the distributor. In the reactor operated according to embodiments of the present disclosure, only hydrogen was fed through the peripheral openings and a mixture of hydrogen and silane was fed through the central openings The amount of gas fed through the peripheral openings was simulated to be about 16.3% by mass of the total amount of gas fed to the reaction chamber. The overall rate of silane and hydrogen introduced into the reactor was the same in both simulations.

For simplicity, the wall deposition was determined without accounting for the fines dynamics in the system. The initial bed temperature set at the onset of simulation was close to the time-averaged overall temperature of a reactor operating for a long period such that the computed dynamics of the fluidized beds within a few seconds of real time would at least qualitatively represent the dynamics of the bed operating for a long a period of time.

As can be seen from FIG. 8, the maximum rate of deposition on the wall is lower in the reactor that used hydrogen as a peripheral gas. This decreases the probability of wall deposits falling to the bottom of the reactor causing reactor downtime.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above methods without departing from the scope of the invention, it is intended that all matter contained in the above description and shown in the accompanying figures shall be interpreted as illustrative and not in a limiting sense.

What is claimed is:

1. A process for introducing a first gas and a second gas into a reaction chamber of a reactor, the reactor comprising at least one reaction chamber wall and a gas distribution unit for distributing the first gas and the second gas into the reaction chamber, the distribution unit comprising a distributor having a plurality of distribution openings including at least one peripheral opening and at least one central opening, each of the distribution openings having a channel portion and a throttle portion, the distribution unit further comprising an inlet block, an outer annular ring, an inner annular ring concentric to the outer annular ring, a product withdrawal tube concentric to the outer annular ring and inner annular ring and that extends through the distributor and inlet block, the space between the distributor, inlet block, outer annular ring and inner annular ring defining a first gas plenum, the space between the distributor, inlet block, inner annular ring and the product withdrawal tube defining a second gas plenum, the process comprising:

introducing the first gas into the first gas plenum and through the peripheral openings into the reaction chamber, the first gas passing through the channel portion at an angle with a longitudinal axis of the reaction chamber and through throttle portion of the distribution openings in a direction that is parallel with the longitudinal axis of the reaction chamber; and introducing the second gas through the second gas plenum and through the central openings into the reaction chamber, the second gas passing through the channel portion and throttle portion of the distribution openings.

2. The process of claim 1 wherein the first gas comprises a gas selected from the group consisting of hydrogen, argon, helium and mixtures thereof.

3. The process of claim 2 wherein the second gas comprises a gas selected from the group consisting of silane, trichlorosilane, and mixtures thereof.

4. The process of claim 1 wherein the distributor comprises a plurality of cones and each distribution opening has a flare-out portion, the flare-out portion being in fluid communication with the throttle portion of the distribution opening and the cone, the gasses passing through the flare-out portion and cones.

5. The process of claim 4 wherein the cones that are in fluid communication with the flare-out portion of the peripheral distribution openings open into the reaction chamber.

6. The process of claim 1 further comprising introducing the first gas into the first gas plenum through a first gas inlet tube in the inlet block.

7. The process of claim 1 further comprising introducing the second gas into the second gas plenum through a second gas inlet tube in the inlet block.

8. The process of claim 1 wherein the first gas plenum is radially outward from the central openings.

9. The process of claim 1 further comprising mixing the first gas and the second gas adjacent the reaction chamber wall.

10. The process of claim 1 further comprising cooling the distributor to a temperature below which material thermally decomposes from either the first gas or the second gas.

11. The process of claim 1 wherein the central openings are parallel with the longitudinal axis of the reaction chamber from the bottom to the top of the distributor.

12. The process of claim 1 further comprising distributing the second gas evenly throughout the reaction chamber.

13. The process of claim 1 further comprising heating the second gas to a temperature above the point at which the second gas decomposes.

\* \* \* \* \*